United States Patent [19]

Tam

[11] 4,383,314
[45] May 10, 1983

[54] CIRCULAR ACCESS LINKAGE LOOP CONFIGURATION FOR SYSTEM COMMUNICATION

[75] Inventor: Richard K. W. Tam, San Diego, Calif.

[73] Assignee: Burroughs Corporation, Detroit, Mich.

[21] Appl. No.: 224,206

[22] Filed: Jan. 12, 1981

Related U.S. Application Data

[63] Continuation of Ser. No. 956,051, Oct. 30, 1978, abandoned.

[51] Int. Cl.³ .............................................. H04J 3/02
[52] U.S. Cl. ........................................ 370/86; 370/88
[58] Field of Search ............................ 370/86, 88, 89; 340/825.05; 364/200

[56] References Cited

U.S. PATENT DOCUMENTS

| Re. 28,811 | 5/1976 | Pierce | 370/88 |
| 3,600,519 | 8/1971 | McNeilly | 370/89 |
| 3,732,543 | 5/1973 | Rocher et al. | 370/88 |
| 3,740,483 | 6/1973 | Pedersen | 370/68 |
| 3,786,419 | 1/1974 | Nick | 370/86 |
| 3,890,471 | 6/1975 | Hachenburg | 370/88 |
| 4,002,842 | 1/1977 | Meyr et al. | 370/86 |
| 4,011,412 | 3/1977 | Mattern | 370/86 |
| 4,039,757 | 8/1977 | Frisone | 370/88 |
| 4,205,326 | 5/1980 | Porter et al. | 370/86 |
| 4,334,305 | 6/1982 | Girardi | 370/86 |

Primary Examiner—Gerald L. Brigance
Attorney, Agent, or Firm—Charles J. Fassbender; J. Ronald Richbourg; Kevin R. Peterson

[57] ABSTRACT

A plurality of CML integrated circuit chips with input and output gates connected in a circular access linkage loop output-to-input with each chip having an interface mechanism comprising an interface register and a bypass arrangement between the input gate and the output gate so that information may flow from a transmitter output gate to a receiver input gate uni-directionally, (clockwise or counter-clockwise) through the loop by means of the bypass with minimal delay.

Utilizing this circular access linkage loop together with a junction box, a number of access loops can be joined together to increase the number of chips which can be linked together.

Also disclosed is a multiplexing scheme utilizing the circular access linkage loop for increasing the gate per pin ratio and for higher speed communication between chips.

4 Claims, 9 Drawing Figures

TTL SYSTEM
PRIOR ART

CML SYSTEM
PRIOR ART

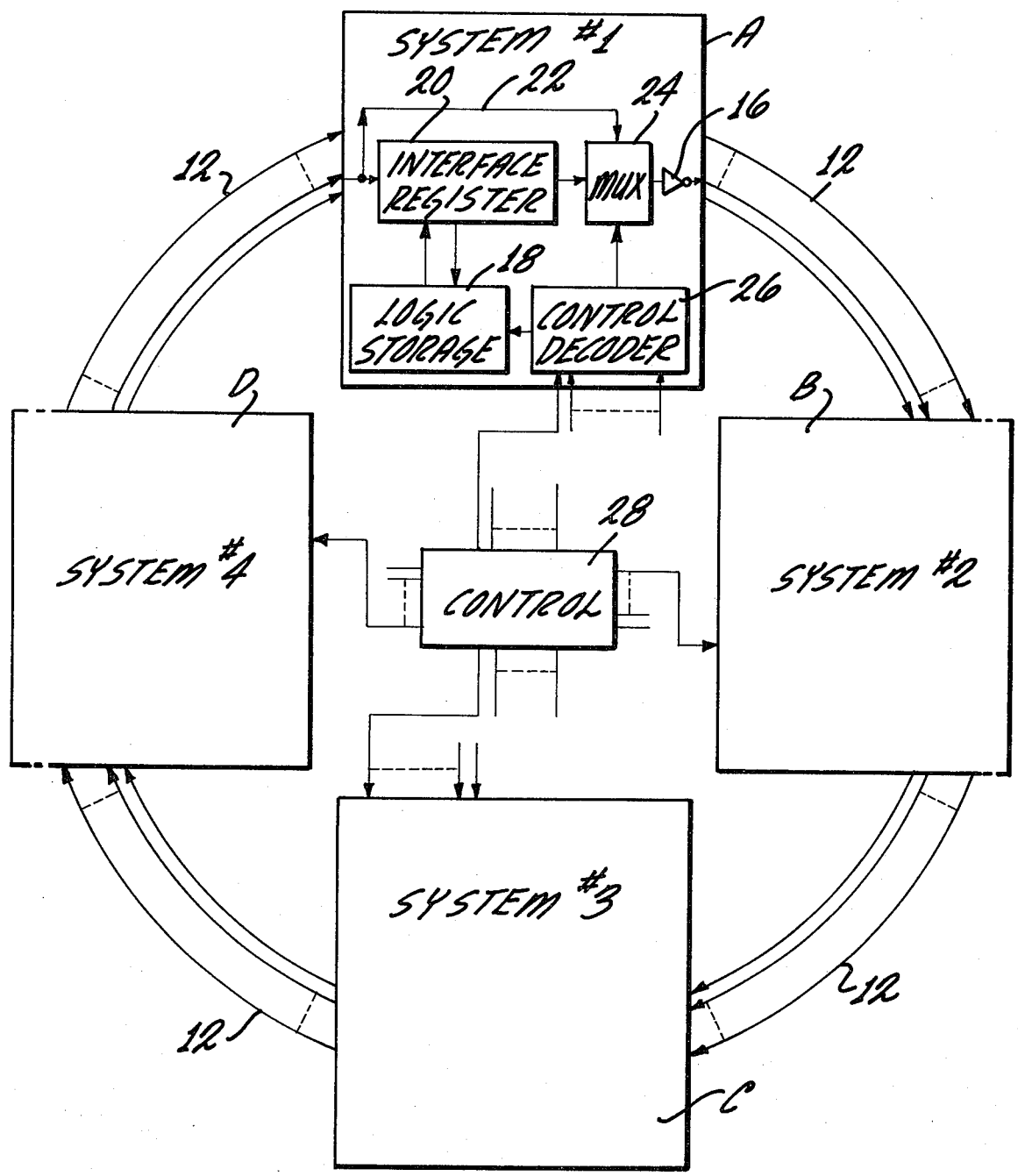

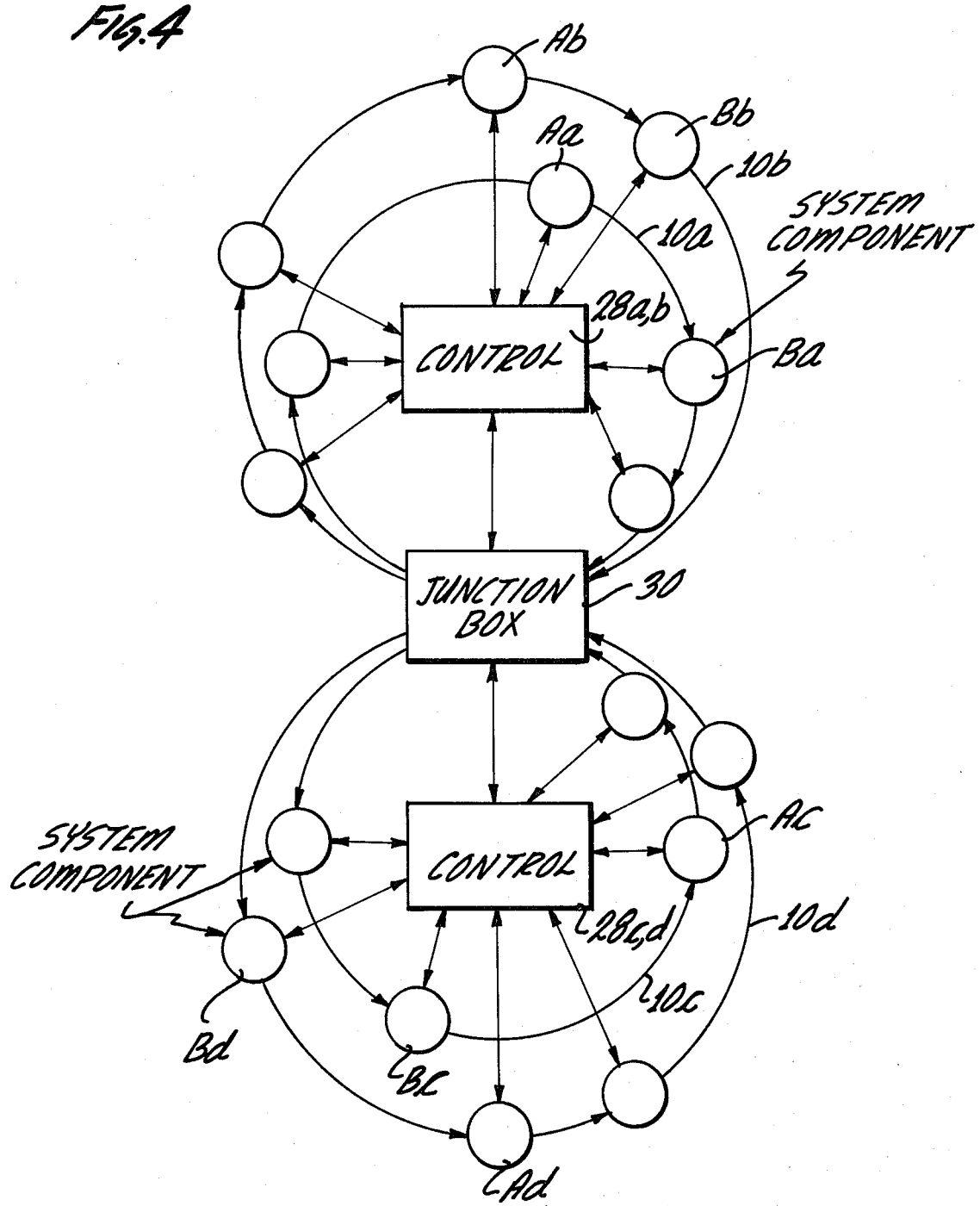

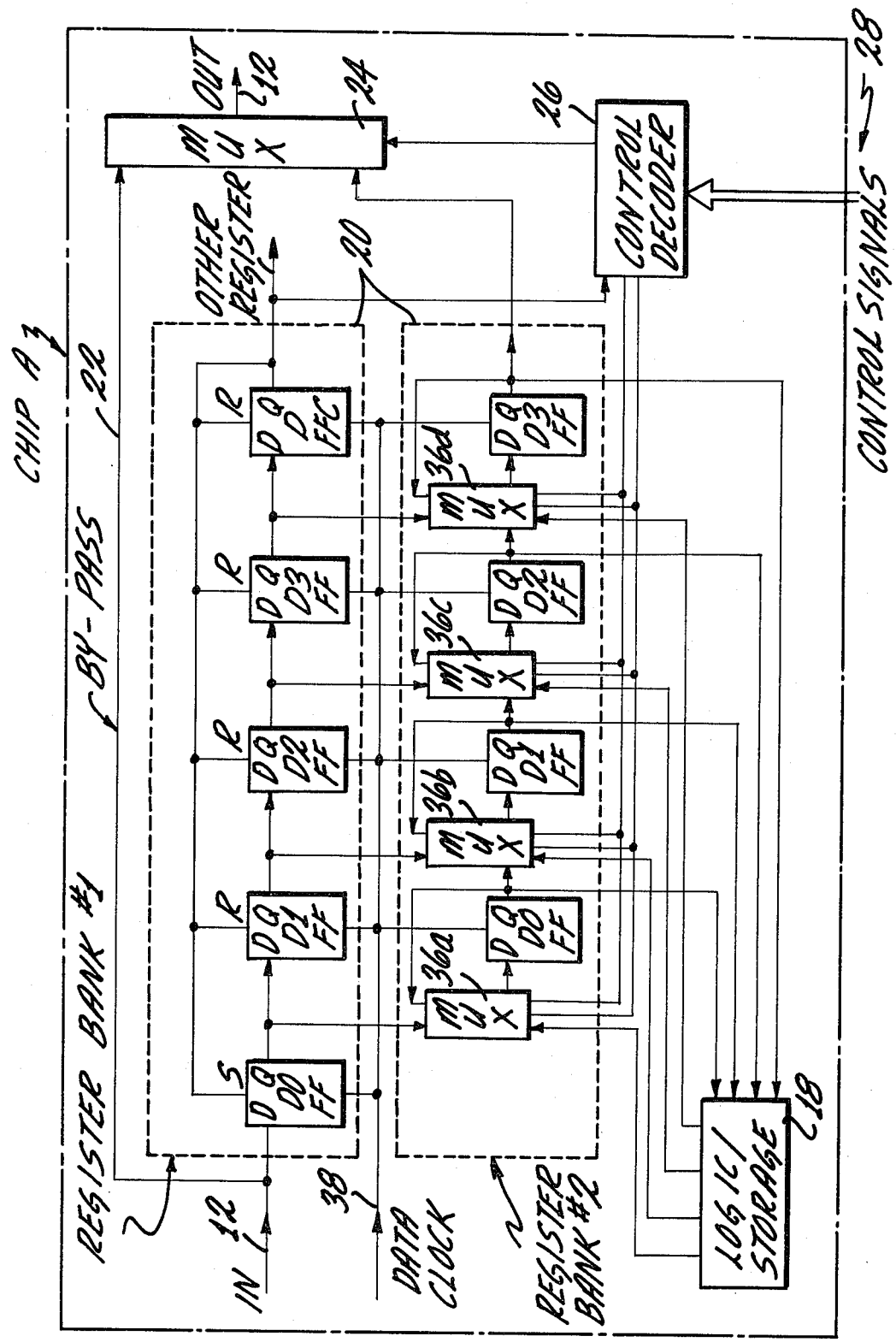

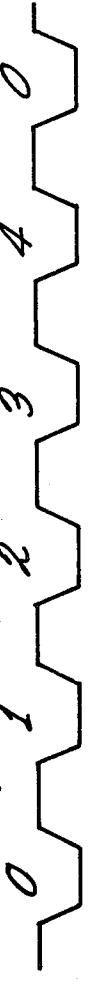
Fig. 6

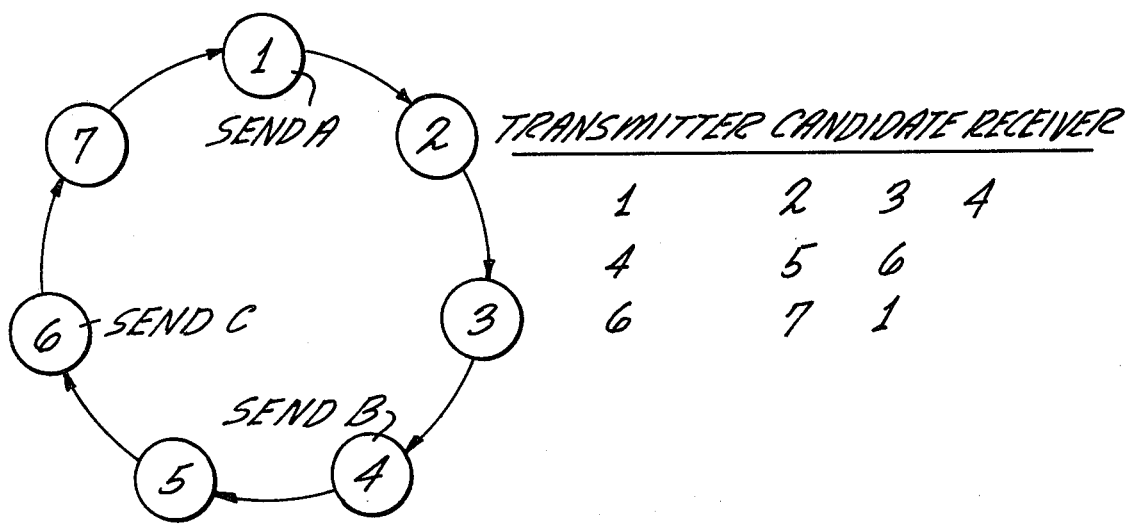
Fig. 7A CONCURRENT COMMUNICATION
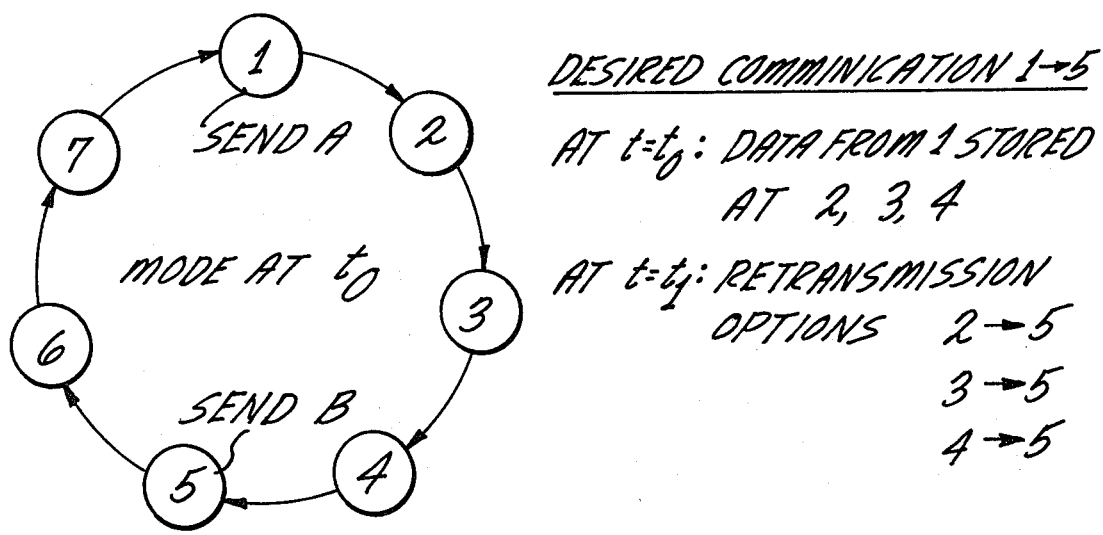
Fig. 7B RETRANSMISSION CYCLE

CIRCULAR ACCESS LINKAGE LOOP CONFIGURATION FOR SYSTEM COMMUNICATION

This is a continuation of application Ser. No. 956,051, filed Oct. 30, 1978.

BACKGROUND OF THE INVENTION

1. Field of Invention

This invention relates, in general, to a means for communication between integrated circuits of the LSI or VLSI type, and, in particular, to intercommunication between CML gates.

2. Prior Art

FIG. 1 shows a typical arrangement of TTL output logic gates connected on a bus structure with the outputs of various gates connected directly output-to-output. Typically, a TTL output circuit can be operated in a high impedence mode so that there is little or no problem in matching impedances when a plurality of outputs are connected together along a common bus.

FIG. 2 illustrates a typical CML output gate comprising a pair of NPN transistors Q1 and Q2 whose emitters are connected in common to a regulated current source with their collectors coupled to a voltage source through a pair of output resistors. The output from the gate is connected between one of the collectors of one of the transistors and one of the output resistors. The base of transistor Q1 forms the gate input and the base of transistor Q2 is connected to a threshold voltage source at a voltage selected to be approximately halfway between the voltage swing of the digital signal (HIGH and LOW) applied to the base input of the transistor Q1, so that current will alternately flow through transistor Q1 or Q2, which, of course, causes the output voltage to go HIGH or LOW according to the voltage drop across the output resistor. Typically, the voltage swing at the output of the gates is 400 mV, with the resistors being 40 ohms and the regulated current source being 10 mA.

Thus, the output of a typical CML gate depends upon the voltage drop across an output resister, a passive component, which is a function of the regulated current source within the chip. The match between the current source and the output resistance for the proper voltage swing on the output of the gate is critical but is within the limitations of IC processing. However, when attempting to connect CML chips to a bus similar to a TTL system, the parallel effect of the output impedances of the CML output devices would result in a reduction of voltage swing. For example, if A and B are connected in parallel as in a bus, the voltage swing at the outputs would be reduced by one-half; three gates would reduce the voltage swing of the output resistors by two thirds; ten gates would reduce the impedance to 4 ohms, etc. It is conceivable that an external resistance could be used for the output gate voltage swing in place of the 40 ohm impedance of each individual device. However, the lack of tracking in the tolerance value between the external resistance and internal current source value of the CML devices may create a saturation and impedance matching problem.

It is clear, therefore, that the outputs of a typical CML output gate cannot be readily connected to a bus, output-to-output as a TTL system, for inter-chip communication because of an impedance matching problem. Thus, for inter-chip communication between CML gates, a multiplexing arrangement, sometimes called a cross-point or cross-bar switch, is provided which contains suitable logic and is responsive to signals applied to its input for connecting, for example, chip A to chip B, chip A to chip C, etc.

This, of course, not only requires additional controls to operate the cross-point switch, but is necessarily large since two pins are required for each gate coupled thereto, as well as pins for connecting the controls to operate the switch. It is apparent, therefore, that the elimination of the cross-point switch and the ability to connect CML chips directly output-to-input for inter-chip communication is a substantial advantage.

It is, therefore, a first object of this invention to provide a system by which CML output gates may be connected for inter-chip communication, eliminating the cross-point switching network now utilized in the CML environment for inter-chip communication.

SUMMARY AND ADDITIONAL OBJECTS OF THE INVENTION

The system which accomplishes the foregoing first object comprises a plurality of CML chips whose output and input gates are connected in a loop, called a circular access linkage loop, with each chip having an interface mechanism comprising an interface register and a bypass arrangement. In this mechanism, information flows from a transmitter chip output gate to a receiver chip input gate unidirectionally (clockwise or counter-clockwise) through the loop by means of the bypass. Utilizing this bypass, information is allowed to pass through the chips with little delay penalty.

While it is recognized also in the prior art that loops such as typically shown in the U.S. Pat. to Takezoe 4,015,241 in FIG. 1 (b) and in the U.S. Pat. to Faber 4,031,512, have been utilized to connect peripheral equipment to a bus structure or information transmission line primarily for preventing one station from dispatching information destined for a non-operating station. However, the utilization of a loop for connecting CML chips input-to-output for inter-chip communication and utilizing a bypass arrangement to bypass the information without delay from the transmitter chip to any subsequent receiver chip through one or more intermediate chips is not known, nor heretofore utilized.

Accordingly, it is a specific object of this invention to couple CML chips in a circular access linkage loop for inter-chip communication.

Still another specific object of this invention is to provide a system of CML chips, connected output-to-input with a bypass arrangement by which information can be passed from a transmitter chip to a receiver chip through the bypass of one or more intermediate chip(s) with minimal gate delay.

Utilizing the basic concept of connecting CML output chips in a circular access linkage loop with an interface mechanism, additional implementations of the basic invention can be made. Utilizing this concept and adding a junction box comprising a buffer storage and routing switches, a communication channel is provided between a plurality of circular access loops, thus removing the constraint on the maximum number of chips that can be linked in a loop in a synchronized system environment having a master system clock cycle.

Too, utilizing the basic concept of this invention with a multiplexing scheme, the number of pins required on a chip can be reduced, thus obtaining a higher gate per pin ratio, thus eliminating the package pin limitation imposed on VLSI technology which has hampered the utilization of VLSI.

Accordingly, an additional object of this invention is the provision of a means for connecting several circular access loops together via a junction box, thus increasing the number of chips that can be utilized in a system.

Still another object of this invention is to provide a means for increasing the number of gates per pin which can be utilized in a CML chip technology.

There is still another advantage inherent in the basic concept of this invention and this relates to the maintenance of this system. Presently, in utilizing the systems such as in FIGS. 1 and 2, if a chip fails there is no way for a service person to locate the inoperative chip without testing and/or replacing the chips in the system until the defective chip is located. Thus, for example, if the system contains a large number of chips, it is a long and tedious process to locate the defective chip. In the present system this process is shortened considerably since the defective chip can be located almost immediately. As, for example, if Chip A is to communicate with Chip B and Chip B does not receive the data, a service person will know that the defect is in either Chip A or Chip B and none other; similarly, if Chip A is to communicate with Chip C and Chip C does not receive the data, a service person will know immediately that the defect is either in Chip A or in Chip C, and so on. The point is that regardless of the number of chips in a system, locating a defective one involves only two chips.

Accordingly, still another object of this invention is to provide a system which minimizes maintenance thereof.

Further, as will be clear from a more detailed description hereinafter, since the interface mechanism is open for data reception at all times, data communication between chips can be carried between multiple pairs of system components at any given time. Under this mode of operation, one transmitter system can communicate along the loop with a number of receiver systems up to the next transmitter system in the loop. Also, utilizing the fact that previously transmitted information is always stored in an interface register, information can be retransmitted without processing from a system in the loop to complete the path in case there is a blockage due to concurrent communication.

Accordingly, still another object of this invention is to provide a system by which communication between multiple pairs of systems can be carried out at any given time.

BRIEF DESCRIPTION OF THE DRAWINGS

FIG. 3 shows a plurality of CML chips incorporating the present invention and connected in a circular access loop;

FIG. 4 shows several circular access loops connected together via a junction box;

FIG. 5 shows a multiplexing mechanism for serial-in, serial-out data transfer to reduce the pin count of the chips;

FIG. 6 is the timing diagram for the multiplex mechanism of FIG. 5; and

FIGS. 7 and 7A illustrate concurrent communication and retransmission of data.

BRIEF DESCRIPTION OF THE PREFERRED EMBODIMENTS

Before the detailed description of the invention, it should be pointed out that the drawings are distorted for the sake of describing the invention in that the amount of chip area taken up by the invention is very small as compared to the area available for the logic or storage function of the chips.

Figure 2:
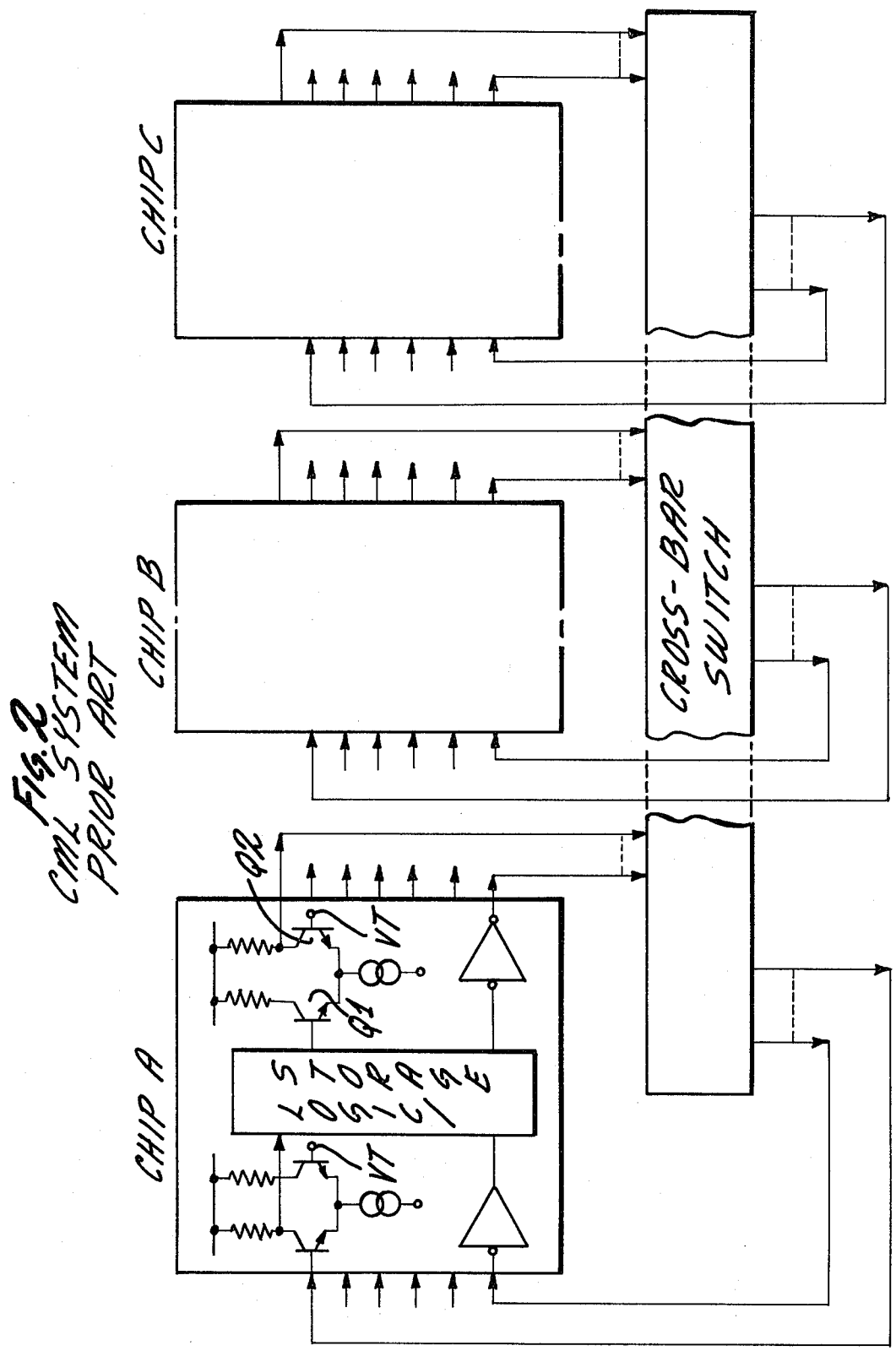
FIG. 2 is a typical prior art arrangement of CML output gates connected to a cross-bar switch.

Turning now to FIG. 3, there is shown the basic concept of the invention wherein a plurality of CML chips, A, B, C and D, also identified as Systems 1, 2, 3 and 4, are linked together, output-to-input, in a circular access linkage loop 10 represented by a number of conductors 12 connecting a number of output gates to a number of input gates of the chips. In Chip A, the input gate is not shown but the output gate 16 is shown by way of example. Both correspond to the representations thereof in Chip A of FIG. 2.

Each chip has an area which contains circuitry for logic or memory represented by block 18 which is connected to an interface mechanism including an interface register 20 for the flow of data to and from the logic or storage area of the chip and a bypass arrangement 22. This interface register 20 is also connected to receive data from a preceding chip, such as System 4, as shown in this Figure.

The chip input is also connected by the bypass arrangement, i.e. conductor 22, to a multiplexer 24, thus bypassing register 20. A control decoder 26 is connected to the logic or memory area 18 and to the multiplexer 24 for operating them from a central control 28 connected to the control decoder 26. The multiplexer 24 is also connected to the output gate 16 which is also the output of the chip and which, in turn, is connected to the input gate of the subsequent chip, System 2, in the loop. Central control 28 is also connected to the other control decoders in Systems 2, 3 and 4.

To explain the operation of the detailed configuration such as shown at System 1, assume that System 1 is a transmitter system.

Data from the logic or storage area 18 is transferred in parallel to its interface register 20. Control decoder 26, subject to signals from the control circuitry 28, operates the multiplexer 24 to output the data to the output gate 16 where it is transmitted to System 2 for a subsequent system in the loop. Whether or not System 2 or another system is a receiver system is within the control of the central control 28.

To understand how the invention operates at System 2, or a subsequent system as a receiver system, attention is again directed back to System 1, since Systems 2, 3 and 4 are only shown in block diagrams for the sake of the simplicity of this disclosure.

Assuming, therefore, that System 1 were to be a receiver system, data coming from one of the other systems in the loop enters the chip gate and interface register 20 and the multiplexer 24 at the same time. To receive the data, the operation of the multiplexer 24 under the control of the decoder 26 and control circuitry 22, would direct the interface register 20 to output the received data in parallel into the logic or storage circuitry 18. On the other hand, if the data from the prior chip is not to be received by System 1, then the decoder 26 under the control of the control circuitry 28 operates to allow the data to be transferred via the bypass line 22 and the multiplexer 24 into the output gate 16 for transmission to a subsequent station. Thus, data in the loop always enters an interface register 20 and the multiplexer 24 and, depending on whether or not the particular chip in question is to receive data or to simply bypass it, is a matter of the control circuitry 28. It is to be noted that there is very little delay for data passing from one system to another through a non-receiving system.

For a convenient reference, a tabulation of the modes of operation of this invention is listed below:

| | OPERATION | | |
|---|---|---|---|
| MODE | SEND | RECEIVE | BYPASS |
| SEND | ACTIVE | ACTIVE | INACTIVE |
| RECEIVE | INACTIVE | ACTIVE | ACTIVE |
| IDLE | INACTIVE | INACTIVE | ACTIVE |

As hereinabove mentioned, there is a limit in the number of chips which can be connected in a loop in a master system clock cycle.

In a synchronized system environment, the master system clock cycle is determined by:

Master clock period = (M+O) X Data clock period.

M—Number of bits multiplexed.

O—Overhead factor required for data multiplexing.

Data clock period—Clock period within which data are transceived through the loop.

Since the fastest rate of information transfer in an N element loop would be limited by the relation:

$$\text{Minimum data clock period} = N X \text{ (bypass delay)} + \sum_{i=1}^{N-1} t_{cdi}$$

$t_{cd}$ = Delay of interconnection between chips.

However, this constraint can be removed by inserting a junction box 30 (see FIG. 4) to provide communication between multiple circular access linkage loops. Thus, in FIG. 4, pairs of loops 10a–d are connected output-to-input to the junction box 30. The details of the junction box 30 are shown in FIG. 4A where there is shown an input routing switch 32 and an output routing switch 34 with four bypass arrangements 22a–d and four buffer or interface registers 20a–d.

Figure 1:
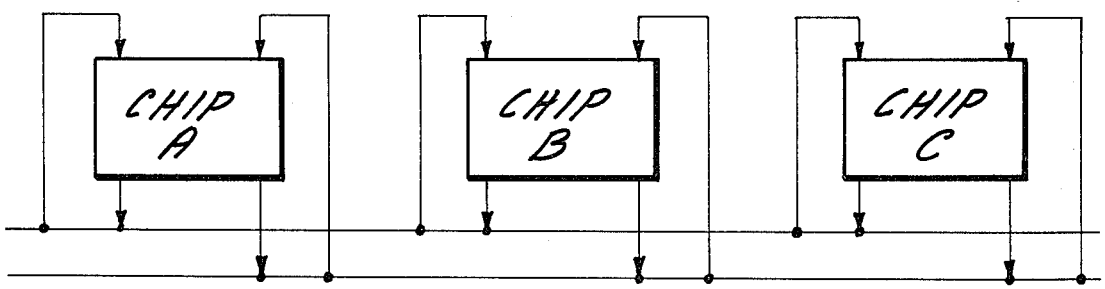
FIG. 1 is a typical prior art arrangement of TTL output logic gates connected to a bus.
Figure 4A:
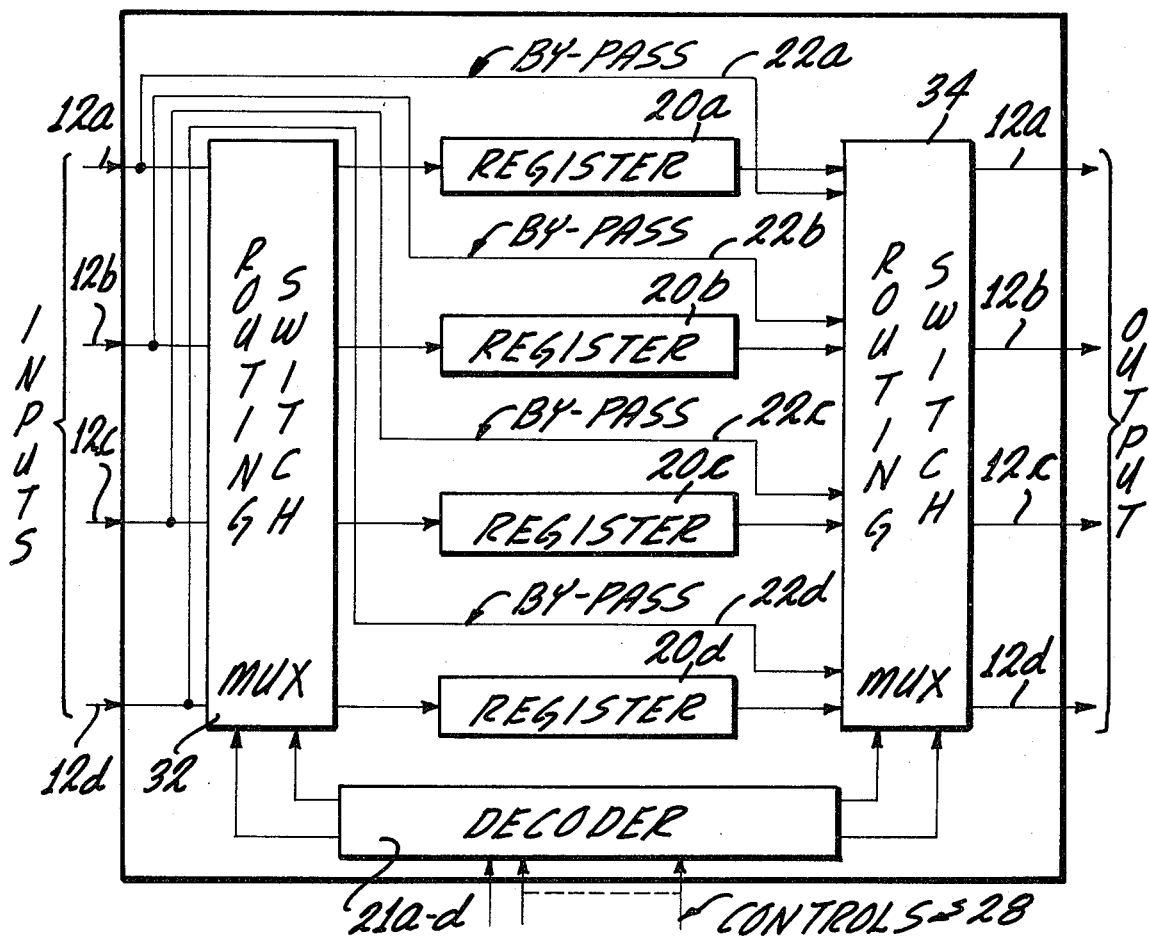
FIG. 4A is an enlarged detailed illustration of the junction box of FIG. 4.

As also can be seen in FIG. 4A, the inputs to the bypass arrangement 22a–d are connected before the input routing switch 32 and the outputs of the bypass arrangement 22a–d are connected to the output routing switch 34 and that each of the buffer registers 20a–d are connected between the two routing switches 32, 34. Thus, the routing switches, being connected and under the control of decoder 26a–d, transfer data from one circular access loop to another circular access loop so that data from any one of the systems of any one of the circular access loops 12a–d can be in communication the same as described in connection with FIG. 3, except that the information is transferred through the junction box 30 where it may be transferred from loop to loop, as well as from system to system.

It should be understood that the routing switches 32, 34 are, in fact, multiplexers connected to the decoders 26a–b and in these FIGS. 4 and 4A those components/circuitry are given the same reference numerals if they perform the same function as those of FIG. 3.

Also, as mentioned above, because of the increase in density of circuit components, the number of logic and storage functions are continually being increased in the same size area, but with the requirement of output gates and pins for each of the functions, an increase in functions simply increases the number of pins required. This poses a severe mechanical packaging and testing problem. As a result, VLSI technology is currently not utilized to its full potential. The basic concept of this invention, i.e., the circular access linkage loop with input-to-output gate connection and the bypass arrangement, allows a multiplexing for the serial transfer of data in and out of a chip which decreases the number of output gates and pins required, thus increasing the gate per pin ratio, allowing a higher level of integration on chip.

Attention is now directed to FIG. 5 which shows a multiplexing arrangement connected to a master system clock.

In this Figure the logic or storage area of the chip is shown as a block diagram 18 whose output is connected for possible transmission of data to and from four multiplexers 36a–d. Also shown are two register banks, Bank No. 1 and Bank No. 2. Register Bank No. 1 contains five D-type flip-flips D0, D1, D2, D3, and DFFC, while Register Bank No. 2 contains four D-type flip-flops, D0, D1, D2, and D3. In the Register Bank No. 1 the data clock input 38 is connected to the five flip-flops D0–DFFC and the data-in line 12 from prior systems in the loop is connected to the data input D of the first flip-flop D0 in the conventional manner while the output Q from this flip-flop is connected to the D input of the subsequent flip-flop D1 as well as to the multiplexer 36a. The remaining flip-flops, D1, D2 and D3, are connected in the same manner while the final full count flip-flop, DFFC, has its Q output fed back to the R & S inputs of the other flip-flops, D0–D3. The output of the full count flip-flop, DFFC, is also connected to the control logic 26 and to an output multiplexer 24. Also, the data input line 12 has a bypass arrangement 22 which is connected directly to the output multiplexer 24, bypassing Register Bank No. 1. Actually, it should be noted that the register banks, control decoder and multiplexer or this Figure correspond to the interface register, decoder and multiplexer of FIG. 3.

In Register Bank No. 2, flip-flips D0–D3 have their clock inputs connected to the data clock line 38 as do the flip-flops of Register Bank No. 1. The data input D of each of the flip-flops is connected to its respective multiplexer 36a–d.

The Q outputs of each flip-flop are fed back to the input of its own multiplexer as well as the subsequent one. In addition, the outputs from Register Bank No. 1 and the data from internal logic/storage are inputted to the multiplexer. Therefore, Register Bank No. 2 has the capacity to either shift, maintain the same state, or be parallel loaded from Register Bank No. 1 or internal logic/storage. Thus, the D0 flip-flop is connected at its D input to multiplexer 36a and its Q output is also fed back to the multiplexer 36a and to the multiplexer 36b. Flip-flops D1–D3 are similarly connected. The output of the last flip-flop D3 of the register bank is not only connected back to its multiplexer 36d but also to the output multiplexer 24. Finally, it is noted that the control decoder is connected to the multiplexers 36a–d.

At the outset, to understand the operation of this multiplexing system, FIGS. 5 and 6 should be considered together. It is noted that it is based on a four-bit data multiplexing capability in the synchronized system environment with only one single data clock with five data clock periods for the transfer of information within a master clock period (not shown). Also, Register Bank No. 1 is to receive incoming data which may or may not be transferred to Register Bank No. 2 through the multiplexers 36a–d. Too, Register Bank No. 2 may or may not transfer data for the logic storage area 18. This will depend upon the control signals controlling the control decoder.

Now with specific reference to FIGS. 5 and 6, assume that the flip-flop D0 in Register Bank No. 1 is in a digital "1" state and that the same connection to all subsequent flip-flops is in a digital "0" state. The "1" stored in D0 flip-flop will be transferred with each clock period in the data clock 38 to a subsequent flip-flop until it reaches the flip-flop DFFC where it is fed back, resetting flip-flops D1–DFFC and setting D0 flip-flop, thus repeating the initial sequence. This one bit transfer is a continual clocking of the flip-flops in Register Bank No. 1 in order to count the bits being transferred and is a continuous operation in this system. At the same time that the bit count reaches flip-flop DFFC, four data bits from line 12 are in the flip-flops D0–D3 and also in the multiplexers 36a–d.

Assuming that Chip A is in a bypass mode and that Register No. 2 is not to receive the data in multiplexers 36a–d, data is simply not transferred out of the multiplexers to the flip-flops in the Register Bank No. 2. It is to be noted, however, that the bypass 22 is connected directly to the output multiplexer 24 so that the data from the prior systems is simply transferred out to a subsequent receiving system.

On the other hand, if Chip A is to receive the data being transferred on line 12, data entering the Register Bank No. 1 is transferred through the flip-flops D0–D3 and into the multiplexers 36a–d as described above, as well as into the flip-flops D0–D3 of Register Bank No. 2. At the same time that the one bit count reaches flip-flop DFFC, all the data has not only been transferred through Register Bank No. 1 but is also at the flip-flop inputs of Register Bank No. 2 where it is to be transferred into the Register Bank No. 2 on the following clock. The data will then be processed or stored by the internal logic/storage.

In a send mode, the control decoder 26 transfers the data from the logic or storage area 18 in parallel into the multiplexers 36a–d and into the flip-flops D0–D3 of the Register Bank No. 2. Thus, subsequent clocking of the data clock 38 transfers all of the data bits serially from the Register Bank No. 2 into the output multiplexer 24 for transfer out of the chip.

Thus, a 4 to 1 ratio in input-output pins savings is readily achieved with this implementation of the invention. In addition, the face that the input-output structures of this linkage has a fan-in, fan-out of only one, system fault isolation is achieved. As mentioned before, if Chip A were to send data to Chip B and Chip B did not receive the data correctly, the fault is in either Chip A or Chip B; similarly if Chip A were to send to Chip C and Chip C did not receive the data correctly, the fault is in either Chip A or Chip C, and so on. Thus, a service person can now isolate a fault between two chips, regardless of how many chips are in the loop(s). Too, techniques to preserve high speed wave form integrity are much simplified due to the unity fan-in/fan-out.

From the foregoing description of Figs. 5 and 6, it can be seen that the interface mechanism is open for data reception from line 12 at all times, and the bypass 22 is disabled only during a send mode. Therefore, communication can be carried out between multiple pairs of systems at any given time. Under this mode of operation, one transmitter system can communicate along the loop with a number of receiver systems up to the next transmitter system in the loop.

In addition, recognizing the fact that previously transmitted information is always stored in the interface register 20 information can be transmitted without processing from another system in the loop to complete the path in case there is a blockage due to concurrent communication between systems.

This latter fact is brought out in FIGS. 7A and 7B taken together with the tables connected thereto.

What is claimed is:

1. A current mode logic system of the type including a plurality of sequential logic modules which communicate to one another; the improvement comprising:

a current mode input gate and a current mode output gate in each of said modules in which an essentially constant current is switched through a pair of resistive elements to indicate the gate's logical state; said modules being connected output-gate-to-input-gate to form a loop for data transmission;

a single centralized control means, outside of said loop, having a plurality of control outputs for generating thereon a plurality of control signals in parallel;

each module of said plurality including a decode means coupled to preselected ones of said control outputs for indicating a Send mode, an Idle mode, and a Receive mode for a preselected time period in response to the control signals that it is sent by said control means;

each of said modules further including synchronized means for sending data from a respective storage means through its current mode output gate in response to said Send mode, for receiving data on its current mode input gate and regenerating the same on its current mode output gate with no sequential logic delays therebetween in response to said Idle mode, and for storing data from its current mode input gate in response to said Store mode;

whereby multiple pairs of said modules can communicate simultaneously and in synchronization with each other over respective portions of said loop in response to said parallel control signals.

2. A current mode logic system according to claim 1 wherein said synchronized means in each of said modules includes first and second register means synchronized to a single clock for receiving data from and sending data to said loop respectively.

3. A current mode logic system according to claim 1 wherein each of said modules further includes multiple ones of said current mode input gates and output gates which are connected between said modules to form a loop for parallel data transmission between said modules.

4. A current mode logic system according to claim 1 and further including a junction box means in said loop for receiving said data signals therefrom and regenerating them on selectable outputs for other loops in response to control signals from said control means.

* * * * *